(12) United States Patent
Pansier

(10) Patent No.: US 9,071,160 B2
(45) Date of Patent: Jun. 30, 2015

(54) POWER-DEPENDENT MAINS UNDER-VOLTAGE PROTECTION

(75) Inventor: Frans Pansier, Nuenen (NL)

(73) Assignee: NXP B.V., Eindhoven (NL)

( * ) Notice: Subject to any disclaimer, the term of this patent is extended or adjusted under 35 U.S.C. 154(b) by 472 days.

(21) Appl. No.: 13/182,462

(22) Filed: Jul. 14, 2011

(65) Prior Publication Data

US 2012/0014146 A1    Jan. 19, 2012

(30) Foreign Application Priority Data

Jul. 15, 2010    (EP) ..................................... 10169729

(51) Int. Cl.
    *H02M 1/32*    (2007.01)
    *H02M 1/42*    (2007.01)

(52) U.S. Cl.
    CPC .............. *H02M 1/4258* (2013.01); *H02M 1/32* (2013.01); *Y02B 70/126* (2013.01)

(58) Field of Classification Search
    CPC ..... H02M 1/32; H02M 1/4258; Y02B 70/126
    USPC ........... 363/21.12, 21.15–21.17, 50; 323/281, 323/284–287
    See application file for complete search history.

(56) References Cited

U.S. PATENT DOCUMENTS

| | | | |
|---|---|---|---|
| 6,229,681 B1 | 5/2001 | Lee | |
| 6,768,655 B1 * | 7/2004 | Yang et al. ................. | 363/21.01 |
| 2005/0152164 A1 * | 7/2005 | Balakrishnan et al. ......... | 363/95 |
| 2005/0270808 A1 | 12/2005 | Choi et al. | |
| 2006/0002155 A1 * | 1/2006 | Shteynberg et al. ........ | 363/21.12 |
| 2006/0171175 A1 * | 8/2006 | Zhu et al. .................... | 363/21.12 |
| 2007/0153439 A1 * | 7/2007 | Matyas ........................... | 361/90 |
| 2008/0304195 A1 * | 12/2008 | Lin ................................ | 361/89 |
| 2009/0021233 A1 | 1/2009 | Hsu | |
| 2009/0039857 A1 * | 2/2009 | Li et al. ......................... | 323/285 |
| 2009/0189585 A1 * | 7/2009 | Huang et al. .................. | 323/285 |
| 2010/0039836 A1 | 2/2010 | Gong et al. | |
| 2010/0289474 A1 * | 11/2010 | Kuo .............................. | 323/284 |

FOREIGN PATENT DOCUMENTS

| | | |
|---|---|---|
| CN | 101656465 A | 2/2010 |
| EP | 2 381 573 A1 | 10/2011 |

OTHER PUBLICATIONS

Extended European Search Report for European Patent Appln. No. 10169729.0 (Nov. 16, 2010).

* cited by examiner

Primary Examiner — Jessica Han
Assistant Examiner — Gustavo Rosario Benitez

(57) ABSTRACT

A method and controller for power dependant mains undervoltage ("brown-out") protection is disclosed. Brown-out protection is meant for protection against overheating due to low mains voltage and associated high mains current. The disclosed method and controller allow for lower mains voltages at low load by comparing the mains voltage with a signal indicating the actual power level of the power supply. In converters such as flyback converters, this brown-out protection can be implemented by comparing the actual peak voltage of the mains voltage with a control signal that indicates the power level. In other embodiments, the mains voltage is compared to a preset level by means of a comparator. Provided the voltage passes the preset level prior to opening the control window, the SMPS functions normally. Conversely, brown-out protection is initiated if the voltage does not pass the preset level before the control window opens.

10 Claims, 3 Drawing Sheets

POWER-DEPENDENT MAINS UNDER-VOLTAGE PROTECTION

CROSS-REFERENCE TO RELATED APPLICATIONS

This application claims the priority under 35U.S.C. §119 of European patent application no. 10169729.0, filed on Jul. 15, 2010, the contents of which are incorporated by reference herein.

FIELD OF THE INVENTION

This invention relates to methods of providing power protection for switched mode power supplies (SMPS).

BACKGROUND OF THE INVENTION

It is well known that the voltage output from a mains supply can vary significantly, in particular in circumstances where the power demanded from the mains supply is greater than that which the supply can deliver.

For applications which require a constant power input, the reduction in mains voltage may be countered by an increased current drawn from the mains. Such may be the case for switched mode power supplies (SMPS), which are typically controlled in order to maintain a constant output power. The situation of mains voltage being considerably lower than the nominal value is known as "brown-out".

Since the increased current can lead to overheating of components or electrical overstress, it is known, in conventional systems, to switch off the application, in this case the switched mode power supply, when the mains voltage drops below a certain predetermined or preset value. It is also known to provide hysteresis in such brown-out protection arrangements, in order to prevent the current oscillations where for example the SMPS repeatedly is switched on and off each successive mains half cycle.

Such brown-out protection provides effective protection for the SMPS against under-voltage conditions; however, switching the SMPS off in all under-voltage situations as soon as the voltage falls below the preset value, irrespective of whether an over-current would actually have occurred, may result in an "overcautious" method of protection, with unnecessarily disturbance to the user.

SUMMARY OF THE INVENTION

It is an object of the present invention to provide an adaptive method of under-voltage protection.

According to an aspect of the present invention there is provided a method of controlling a mains-connected switched mode power supply comprising: determining a signal indicative of a power drawn by the switched mode power supply; determining a signal indicative of a mains voltage; determining whether a brown-out condition is met, in dependence on both the signal indicative of a power drawn and the signal indicative of the mains voltage; and in response to detecting a brown-out condition, disabling the switched mode power supply.

In embodiments, the switched mode power supply comprises a power factor correction stage. In some such embodiments, the signal indicative of a power drawn by the switched mode power supply is a width of a operating window for the power factor correction stage around the peak of the mains cycle, the signal indicative of a mains voltage is a signal indicative of the mains voltage at the start of the operating window, and the brown-out condition is that the mains voltage at the start of the operating window does not exceed a predetermined threshold voltage. In such embodiments, the method may be particularly simple to implement; since a power factor correction stage operating under window control is operational for only part of the mains cycle, around or even centred on the peak of the mains voltage, and the width of the operating window decreases with drawn power, the width of the operating window, which is utilised in the control itself, provides an indication of the drawn power. Further, in these embodiments, the mains voltage of most interest is the instantaneous voltage at the start of the operating window: this depends not only on the peak mains voltage, but also on the width of the operating window (and thus the phase of the mains cycle at which the operating window opens).

In embodiments, the method further comprises widening the operating window in response to the disabling of the switched mode power supply. Advantageously, in embodiments, the operating window may be arranged to automatically widen in response to the disable of the switched mode power supply: as a result of disabling the switched mode power supply, its control system may indicate that the delivered power is insufficient, and thus the window control widens the window in an attempt to provide more power. Beneficially, this provides a degree of hysteresis, since the wider window in the subsequent mains cycle results in the mains voltage being measured earlier in its phase, so for an invariant mains under-voltage, the measured voltage will be even lower; equivalently, the under-voltage must significantly relax for the measured value to exceed the threshold voltage—thus preventing bouncing between on-and-off states.

In other embodiments, the signal indicative of a mains voltage is determined from a bus voltage (Vbus) which is a rectified and smoothed mains voltage, and the signal indicative of a power drawn is a control signal which controls a switch of the switched mode power converter.

In embodiments, determining whether a brown-out condition is met comprises comparing the difference between a scaled version of the control signal and a scaled version of the signal indicative of a mains voltage with a threshold signal, and the brown-out condition is met if the difference between a scaled version of the control signal and a scaled version of the signal indicative of a mains voltage does not exceed the threshold signal. At least one of the scaling factors may be unity, and this part of the method may conveniently be implemented by means of current mirrors.

In embodiments, the threshold signal is a threshold voltage. The comparison may then be conveniently made using a voltage comparator, having as one input the threshold voltage, and as the other input a voltage derived from the difference between the scaled version of the control signal and the scaled version of the signal indicative of a mains voltage.

In embodiments, the switched mode power supply comprises a switch and a transformer. The signal indicative of a mains voltage may then be determined from a current through an auxiliary winding of the transformer at a moment when the switch is closed. Further, the signal indicative of a mains voltage may be determined from a current through a resistor connected to the bus voltage. Then or otherwise, the scaled version of the signal indicative of a mains voltage may comprise a tap from a voltage divider between the bus voltage and ground, although this likely results in relatively higher losses.

In embodiments, the switched mode power supply comprises a flyback-converter. However, the skilled person will appreciate that the invention is not so limited, and will encompass other types of switched-mode converter, such as without limitation resonant converters, forward converters, buck-boost converters and the like, as well as power factor correction stages whether or not window control is used.

According to another aspect of the present invention, there is provided a controller for a switched mode power supply, the controller being adapted to operate a method according to any preceding claim.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
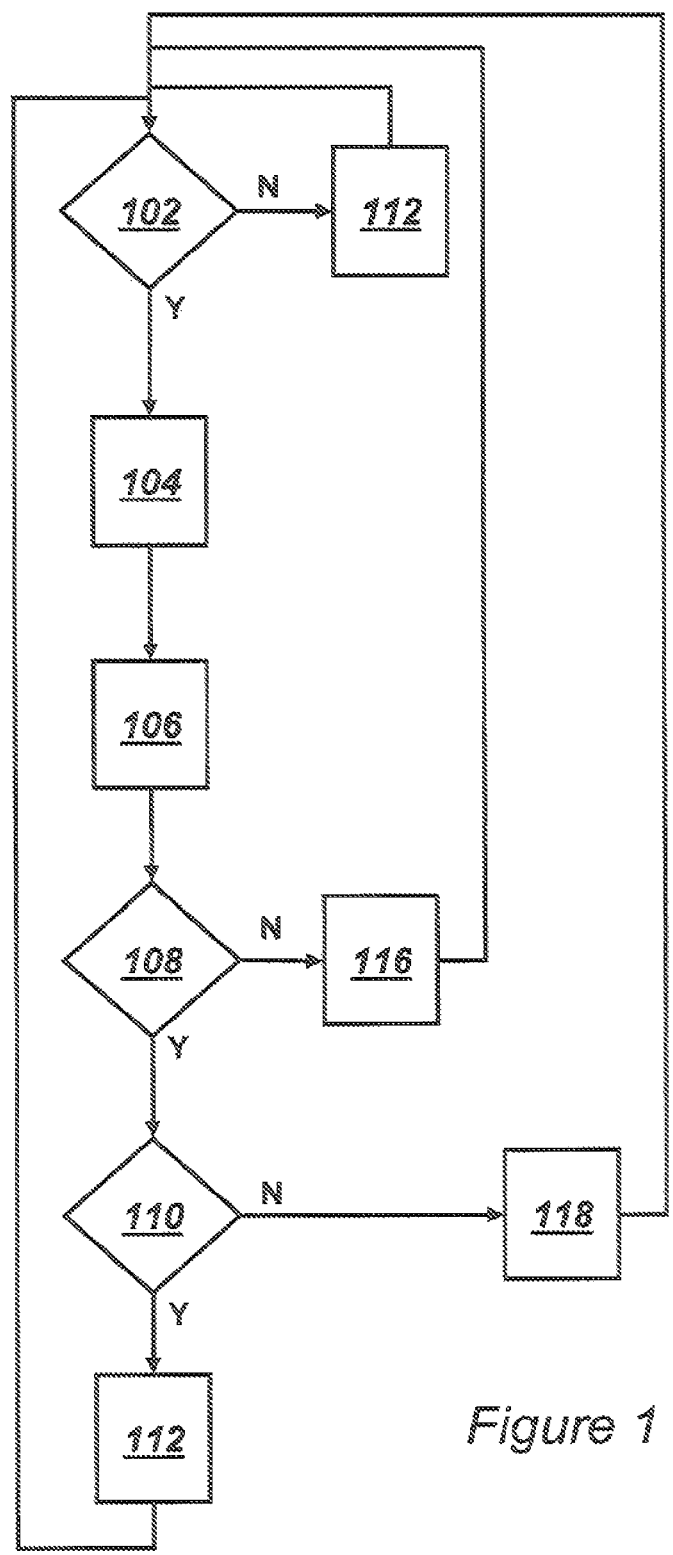
FIG. 1 is a flow diagram of a method according to embodiments of the invention

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Embodiments of the invention benefit from the realisation of the inventor that under-voltage protection, that is to say, protection against brown-out conditions, is only necessary where a high current is being drawn. Thus, when an application is drawing a lower current, a more significant under-voltage can be tolerated. Thus, an adaptive form of brown-out protection which depends not only on the mains voltage, but also on the drawn power. At a basic level, then, embodiments of the invention involve controlling a mains-connected switched mode power supply by: determining a signal indicative of a power drawn by the switched mode power supply; determined a signal indicative of a mains voltage (as discussed below, this may be, without limitation an instantaneous voltage, or a smoothed bus voltage); determining whether a brown-out condition is met, in dependence on both the signal indicative of a power drawn and the signal indicative of the mains voltage; and in response to detecting a brown-out condition, disabling the switched mode power supply. Thus even if there is an under-voltage in the mains, the brown out condition may not occur if the drawn power is sufficiently low. In extremely low power application, a (relatively) extremely low mains voltage may be tolerable.

Embodiments of the invention may vary significantly in implementation. A flow-diagram of embodiments of the invention is shown in FIG. 1. In the figure, and SMPS is initially considered to be operated normally (alternatively, the SMPS could be in a brown-out mode). At 102 it is checked whether the conditions for checking the brown out level are met. As will be described in more detail below, for a SMPS having a power factor correction stage with window control the condition for checking the brown out level occurs at the moment the operating window opens; alternatively, for some embodiments involving flyback converters, the condition may be that the SMPS switch is on; in other embodiments, an average value for the mains voltage may be derived and held, and this step is then redundant. If the condition is not met, at 112 the operation (or off-mode) is continued as normal.

If the condition is met, at 104 power level is checked. Then at 106, the brown out condition is derived. For PFC with window control, this may be a threshold voltage relative to the instantaneous mains voltage; alternatively, for an exemplary flyback convertor, the condition may be a scaled control voltage used to control the SMPS, relative to a scaled version of the bus voltage. At 108 it is checked whether the mains voltage (the instantaneous mains voltage, and the scaled version of the bus voltage, respectively in the two examples above) exceeds the brown-out condition. If the mains voltage does not exceed this value, at 116 the SMPS is stopped (or maintained in the off-mode as appropriate). Otherwise, it is checked at 110 whether the SMPS was on; if yes, operation is continued at 112, and if not the SMPS is started at 118.

Figure 2:
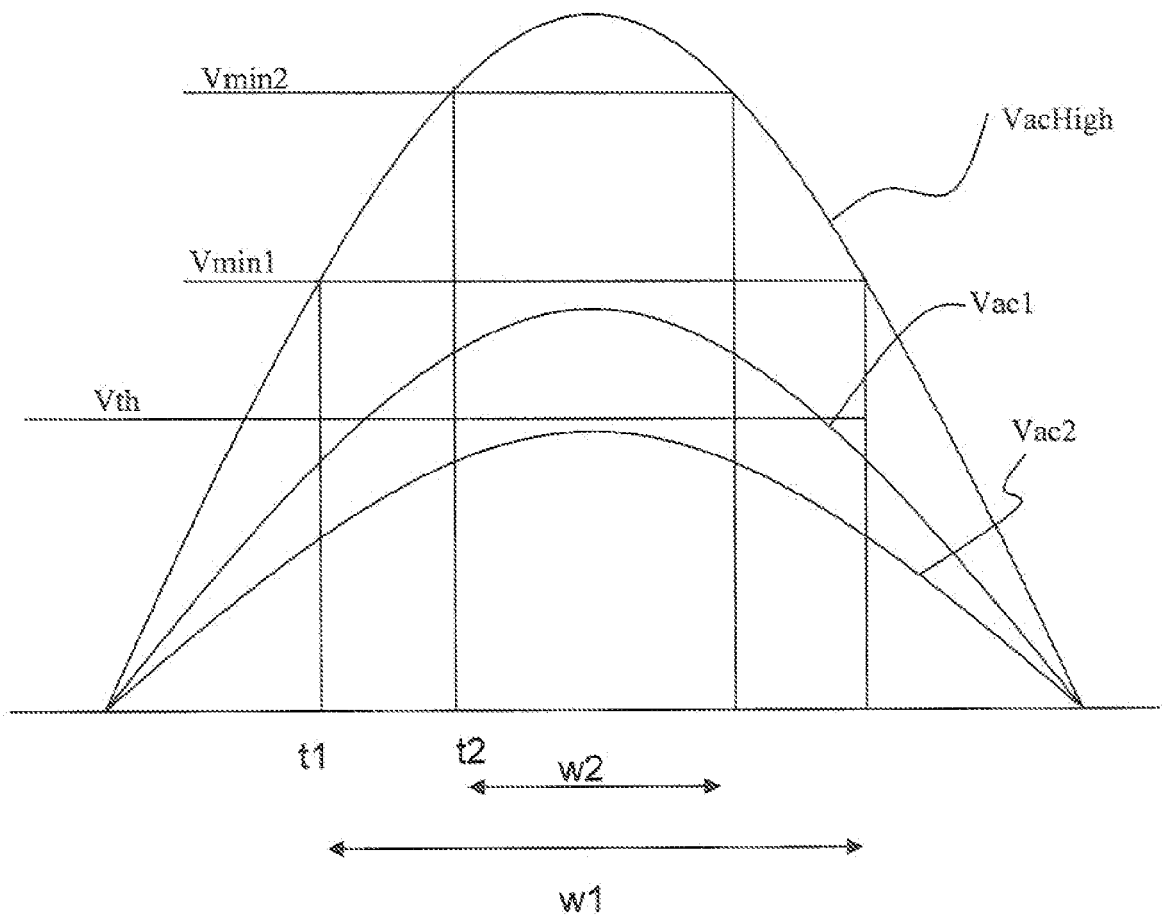
FIG. 2 illustrates control windows related to a sinusoidal mains half-cycle for SMPSs comprising a power factor stage and operating within a control window.

An embodiment of the present invention, which embodiment is applicable to SMPSs having power factor control (PFC) stage, will now be described, with reference to FIG. 2. A typical SMPS incorporating the PFC stage only operates over part of the mains cycle, while the mains voltage is close to its peak value. Consider first operation under normal conditions, that is to say, with VacHigh Thus, for instance, when providing a moderate power, the SMPS may operate only during the period w1 around the peak of the mains voltage, which period starts at a moment t1. While that the SMPS is operating, the mains voltage is equal to or exceeds some minimum voltage Vmin1. Of course, the skilled person will appreciate that the window w1 and moment t1 relate primary to the relative phase of the mains, rather than a specific number of milliseconds. Moreover, when providing a lower power, the SMPS may operate only during the shorter period w2 around the peak of the mains voltage, which period starts at a moment t2. While that the SMPS is operating, the mains voltage is equal to or exceeds some minimum voltage Vmin2. Further, the Vmin2 is greater than Vmin1 (since it is more closely centred around the peak of the mains voltage. Thus, t1 will be immediately apparent that, for a fixed mains peak voltage, the minimum voltage of the control window decreases with increasing power requirement of the SMPS. In the limit case, of course, the control window covers the whole of the mains half cycle, such that the minimum voltage of control window is zero.

The minimum voltage, Vmin of the control window can thus be used in order to determine a power-dependent brown-out protection level according to embodiments of the invention. A low value of Vmin corresponds to a higher power being drawn from the SMPS.

Consider now the situation with under-voltage: shown in the figure is a preset threshold voltage Vth. For a moderate under-voltage, shown as Vac1, at the moment t1 when the wider control window w1, corresponding to a relatively higher drawn power, opens, the mains voltage (that is to say, the instantaneous mains voltage at that moment), is lower than the threshold voltage. Hence, at the moment t2 when the smaller control window w2, corresponding to a relatively lower drawn power, opens, the mains voltage is higher than the threshold voltage. Thus, by suitable choice of the value of the threshold voltage, one can discriminate between an acceptable condition (ie only low power is drawn), and an unacceptable condition: the comparison between the threshold and the instantaneous mains voltage can be used to determine whether brown-out which requires the SPMS to be switched off, has occurred.

Considering next a more severe under-voltage, shown as Vac2: in this case, the instantaneous mains voltage is below the threshold for both the wider (lower drawn power) window w1, and narrower window w2, so whichever load the SMPS is supplying, either lower or moderate drawn power, the brown-out is triggered to disable or switch off the SMPS. Of course, for the degree of under-voltage shown as Vac2, there is no drawn-power conditions for which the brown-out does not trigger, since the mains voltage at no time exceeds the threshold.

In an implementation, the mains voltage (which is rectified so as to be a half sine wave) is compared with the preset level using a comparator. The comparator is set to be high whenever the instantaneous mains voltage is higher than this preset value. This is compared with the level at the start of the control window. If the comparator goes high before the control window opens, that is to say, if the preset level is lower than Vmin, the PFC is allowed to operate normally.

However, should the comparator be low at the start of the PFC window, which condition is equivalent to the instantaneous mains voltage being lower than the preset value when the PFC control window should open, then the brown-out protection is triggered, and operation of the SPMS is disabled.

In other, simpler, implementations, the comparison is only made at the start of the operating window.

As a numerical example of this embodiment, consider a PFC operating with a maximum control window of 6 ms in each mains half-cycle (where the mains frequency of 50 Hz, such that each half-cycle last 10 ms.). With a preset value of 75V, for full power operation (ie the PFC operating over the maximum control window, that is to say, for 6 ms out of each 10 ms half-cycle), then the brown-out protection would be triggered if, 2 ms after the start of the half-cycle, the mains voltage is still less than 75V.

That is, the brown-out protection would disable the SMPS, if:

$$V\text{peak}*\sin(2/10.\text{pi.})<75V \quad (1)$$

This condition is fulfilled if Vpeak<127 V. So, once the mains voltage falls below 127 peak (ie 90V AC rms), the SMPS is disabled.

However, consider now the situation nowhere are the SMPS is providing a very small, standby, level of power (typically 1% or less of its full-load power). In such cases, the control window will be very small around the peak voltage, and typically of the order of 0.06 ms. Then they equivalent condition is that:

$$V\text{peak}*\sin(4.97/10.\text{pi.})<75V \quad (2)$$

This condition is fulfilled if Vpeak<75.003 V. So, provided the mains voltage does not fall below 75.003V peak (ie 53V AC rms), the SMPS will remain operational.

Figure 3:
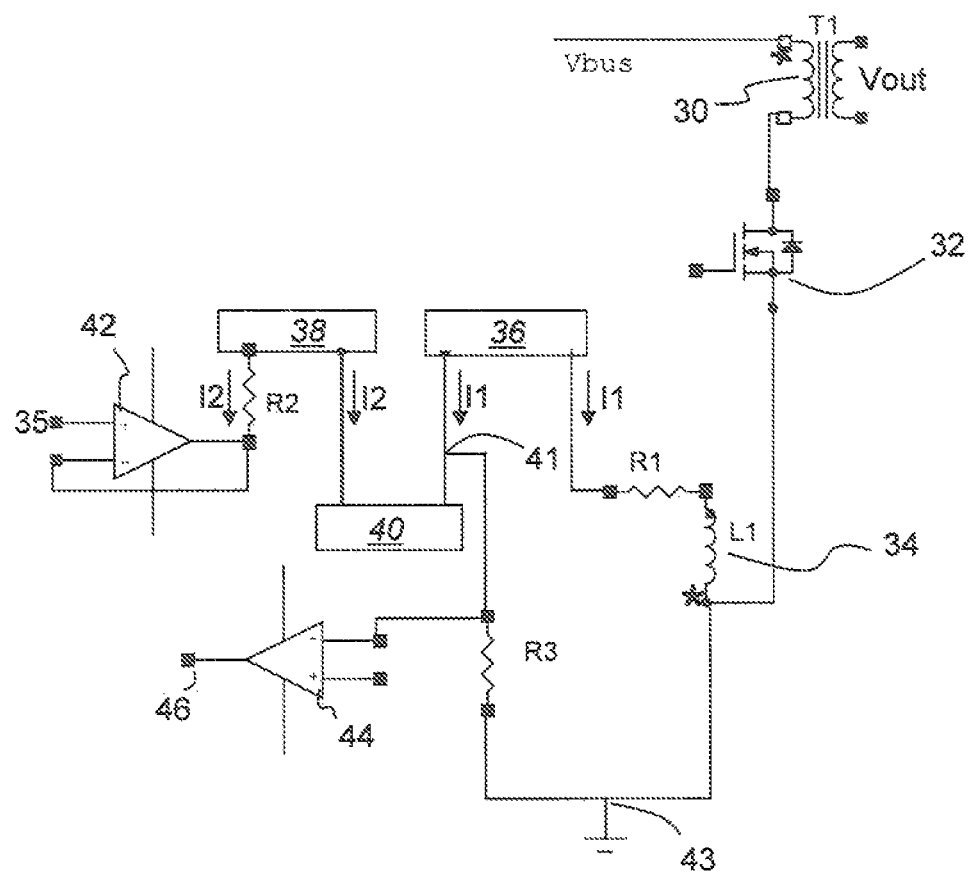
FIG. 3 illustrates schematically part of a controller for an SMPS, according to an embodiment of the embodiment.

Another embodiment of the invention is shown in FIG. 3, which depicts a flyback converter, together with a schematic of a circuit for providing adaptive brown-out protection according to embodiments of the invention. Although example shown in the figure is a flyback converter, the skilled person will immediate appreciate that analogous methods and circuitry may be used for other types of converters.

FIG. 3 shows a schematic circuit diagram of a power dependent brown-out protection implemented in such a controller. FIG. 3 shows a flyback converter comprising a transformer 30, which supplies voltage Vout across the secondary winding. The primary winding is connected to the rectified and smoothed mains, and has input voltage Vbus, and is switched by means of control FET 32. An auxiliary primary winding L1, oppositely wound to the main primary winding, and having one end grounded at 43, is shown at 34. This auxiliary winding is connected to a first resistor R1. The current through R1 is thus a measure of the bus voltage during the on-time of the control FET 32. In other embodiments, a bleeder resistor, connected directly to Vbus, may be used, at the expensive of higher losses. The current, I1 through R1 is mirrored by first current mirror 36

A control voltage Vcontrol is used for the primary control (not shown) of the SMPS; that is to say, Vcontrol is used to control the timing of Control FET 32, and thus determines the output power from the SMPS: a low voltage on Vcontrol indicates a low output power, and a high voltage indicates a high output power. Vcontrol is input to first input of a first op-amp 32 which buffers the voltage; the output of the buffer is connected to a second resistor R2. The current, I2, through R2 varies with the difference between Vx and Vcontrol, where Vx is a fixed voltage which will be discussed in more detail below. The current I2 is mirrored by second current mirror 38.

The current through a third resistor R3 is now arranged to be the difference between I1 and I2, that is to say, the currents through R1 and R2. I1 and I2 are connected through third current mirror 40, and the third resistor R3 is connected to node 41 adjacent this current mirror 40 so that the current through R3 is equal to that through R1 less that through R2. The voltage across third resistor R3 is then a weighted average of the R1 and R2 currents. This voltage level (at node 41 on R3 relative to ground 43), is used as one input to a comparator 34, the other input of which is a fixed voltage Vfixed. The fixed voltage Vfixed is set to a suitable convenient value, which could be zero in the case of a converter having positive and negative supplies, but will usually be a non-zero reference Vref for a single-sided converter.

When Vcontrol is low, the required power level is low, and only a small portion of the current through R1 is directed to ground. So already at a low level of Vbus, the voltage across R3 is sufficient to trigger the comparator 44; that is to say the converter is enabled.

Conversely, if the level of the control is set high, that is to say a high output is required from the SMPS, a higher value for the bus is required to ensure the voltage at mode 46 is high enough to trigger the comparator, to ensure the SMPS is not disabled.

It should be noted that the current mirrors may be configured to scale the currents, thus providing an additional degree for freedom, so the resistors can be chosen so reduce resistive losses.

Operation of the circuit of FIG. 3 may be analysed as follows (in which the two current mirrors are referenced to a voltage Vx):

$$I_{R1} = \frac{V_x + aV_{bus}}{R_1} \quad (3)$$

$$I_{R2} = \frac{V_x - V_{control}}{R_2} \quad (4)$$

$$V_{R3} = RI_{R1} - I_{r2} = R_3\left(V_x \frac{R_2 - R_1}{R_1 R_2} + \frac{aV_{bus}}{R_1} + \frac{V_{control}}{R_2}\right) \quad (5)$$

so the higher $V_{control}$ the lower the level of $V_{bus}$ to give the same trigger voltage across R3.

In this embodiment, then, the Vcontrol signal provides an indication of the power drawn by the switched mode power supply. The output power from an SMPS is lower than the power drawn, as the conversion efficiency is less than 100%, and typically includes resistive, capacitive and inductive losses in the SMPS. Neglecting secondary effects such as acoustic noise, the losses results in heat.

Although embodiments of the invention have been described above relating to controllers having PFC stages, and flyback converters, the invention is not limited thereto, and is applicable, without limitation, to other SMPS, such as boost converters, buck converters, half-bridge converters and the like.

In summary, then, seen from one viewpoint, a method and controller for power dependant mains under-voltage ("brown-out") protection has been disclosed above. Brown-out protection is meant for protection against overheating due to low mains voltage and associated high mains current. Usually this is coupled to the absolute value of the mains voltage, but for devices operating at low power this is not necessary, as overheating will not occur. The disclosed method and controller allow for lower mains voltages at low load by comparing the mains voltage with a signal indicating the actual power level of the power supply.

In converters such as flyback converters, this brown-out protection can be implemented by comparing the actual peak voltage of the mains voltage with a control signal that indicates the power level, such as the current through the optocoupler in the feedback loop. In other embodiments, where the SMPS operates only within a control window around the peak of the sinusoidal mains voltage, the mains voltage is compared to a preset level by means of a comparator. Provided the voltage passes the preset level prior to opening the control window, the SMPS functions normally. Conversely, brown-out protection is initiated if the voltage does not pass the preset level before the control window opens.

From reading the present disclosure, other variations and modifications will be apparent to the skilled person. Such variations and modifications may involve equivalent and other features which are already known in the art of switch mode power supplies, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of controlling a mains-connected switched mode power supply comprising:
   determining a signal indicative of a power drawn by the switched mode power supply, wherein the signal indicative of the power drawn by the switched mode power supply is a control signal that is an input to an operational amplifier of the switched mode power converter, which is connected to three current mirrors that are connected in series, and controls a timing of a switch connected to a primary winding of a transformer of the switched mode power converter that is connected to the three current mirrors through an auxiliary primary winding;
   determining a signal indicative of a mains voltage;
   determining whether a brown-out condition is met, in dependence on both the signal indicative of a power drawn and the signal indicative of the mains voltage; and
   in response to detecting a brown-out condition, disabling the switched mode power supply,
   wherein the determining whether a brown-out condition is met comprises comparing a threshold signal with a difference between a scaled version of the control signal and a scaled version of the signal indicative of the mains voltage,
   and the brown-out condition is met if the difference does not exceed the threshold signal.

2. The method of claim 1, wherein the switched mode power supply comprises a power factor correction stage.

3. The method of claim 1, wherein the signal indicative of the mains voltage is determined from a bus voltage which is a rectified and smoothed mains voltage.

4. The method of claim 1, wherein at least one of the scaling factors is one.

5. The method of claim 1 wherein the threshold signal is a threshold voltage.

6. The method of claim 3, wherein the switched mode power supply comprises a switch and a transformer.

7. The method of claim 6, wherein the signal indicative of the mains voltage is determined from a current through an auxiliary winding of the transformer at a time when the switch is closed.

8. The method of claim 3, wherein the signal indicative of the mains voltage is determined from a current through a resistor connected to the bus voltage.

9. The method of claim 6, wherein the switched mode power supply comprises a flyback-converter.

10. A controller for a switched mode power supply, the controller being adapted to operate a method according to claim 1.

* * * * *